(12) United States Patent  (10) Patent No.: US 8,077,127 B2
Cho et al.  (45) Date of Patent: Dec. 13, 2011

(54) LIQUID CRYSTAL DISPLAY DEVICE AND METHOD OF DRIVING THE SAME

(75) Inventors: Jae-Hyun Cho, Seoul (KR); Jin-Ho Park, Gyeonggi-do (KR); Jung-Hwan Cho, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 838 days.

(21) Appl. No.: 11/776,446

(22) Filed: Jul. 11, 2007

(65) Prior Publication Data

US 2008/0018813 A1    Jan. 24, 2008

(30) Foreign Application Priority Data

Jul. 18, 2006   (KR) .................. 10-2006-0066659

(51) Int. Cl.
 *G09G 3/36* (2006.01)
(52) U.S. Cl. ........................................................ 345/87
(58) Field of Classification Search .................. 375/87, 375/92; 349/19, 33, 34, 139, 88, 191, 122, 349/123, 127, 132–136
See application file for complete search history.

(56) References Cited

U.S. PATENT DOCUMENTS

| 7,426,003 | B2 * | 9/2008 | Tien et al. ................... 349/75 |
| 2003/0122753 | A1 * | 7/2003 | Park ............................. 345/87 |
| 2004/0227888 | A1 * | 11/2004 | Tak et al. ..................... 349/139 |
| 2005/0052396 | A1 * | 3/2005 | Kim .............................. 345/99 |

FOREIGN PATENT DOCUMENTS

| CN | 1428761 A | 7/2003 |
| CN | 1550862 A | 12/2004 |

* cited by examiner

*Primary Examiner* — Richard Hjerpe
*Assistant Examiner* — Jeffrey A Parker
(74) *Attorney, Agent, or Firm* — Innovation Counsel LLP

(57) ABSTRACT

An LCD device includes an LCD panel and a power supply section. The LCD panel includes a first substrate having a storage electrode and a pixel electrode, a second substrate having a common electrode, and a liquid crystal layer interposed between the first and second substrates. The LCD panel has an alignment interval during which liquid crystal molecules are transitioned from a splay state to a bend state and a normal operating interval during which an image is displayed in the bend state. The power supply section supplies a first alignment voltage that is higher than the data voltage to the common electrode and supplies a second alignment voltage that is lower than the data voltage to the storage electrode, during the alignment interval. Thus, a transition speed from a transient splay state into a bend state is enhanced, so that an alignment interval may be decreased.

12 Claims, 7 Drawing Sheets

(b)

LIQUID CRYSTAL DISPLAY DEVICE AND METHOD OF DRIVING THE SAME

CROSS-REFERENCE TO RELATED APPLICATIONS

This application claims priority under 35 U.S.C. §119 to Korean Patent Application No. 2006-66659, filed on Jul. 18, 2006 in the Korean Intellectual Property Office (KIPO), the contents of which are herein incorporated by reference in their entirety.

BACKGROUND OF THE INVENTION

1. Field of the Invention

The present invention relates to a liquid crystal display (LCD) device and a method of driving the LCD device. More particularly, the present invention relates to an LCD device capable of enhancing the speed of transition speed of liquid crystal molecules from the transient splay state into the bend state, and a method of driving the LCD device.

2. Description of the Related Art

Generally, a liquid crystal display (LCD) device includes an LCD panel that displays an image. The LCD device typically includes a thin-film transistor (TFT) substrate having a pixel electrode formed thereon, a color filter substrate having a common electrode formed thereon and a liquid crystal layer interposed between the TFT substrate and the color filter substrate. When an electric field is applied to the liquid crystal layer, the arrangement of liquid crystal molecules in the liquid crystal layer undergoes a transition that changes the optical transmittance of the liquid crystal layer to display an image.

Recently, an optically compensated birefringence (OCB) mode has been employed to increase the viewing angle and a response speed of the LCD device. The OCB mode drives the liquid crystal molecules in the LCD device after the liquid crystal molecules are bend-aligned. Particularly, after the liquid crystal molecules are homogenously aligned at an initial state, the liquid crystal molecules sequentially conform to a transient splay state, an asymmetric splay state, and a bend state at which time a predetermined voltage is applied to the liquid crystal molecules to drive the liquid crystal molecules in the OCB mode.

A predetermined time is needed in the OCB mode LCD device in order to obtain the bend state. However, when the predetermined time is long, display errors such as spots or flicker occur due to characteristics of the splay state of the liquid crystal molecules. Therefore, the OCB mode liquid crystal molecules are required to be quickly transitioned from a transient splay state into a bend state.

SUMMARY OF THE INVENTION

According to one aspect of the present invention a liquid crystal display (LCD) device having an enhanced transition speed of transition from the splay state into the bend state.

The present invention also provides a method of driving an LCD device capable of enhancing a transition speed at which liquid crystal molecules transition from the transient splay state into the bend state.

In one aspect of the present invention, an LCD device includes an LCD panel and a power supply section. The LCD panel includes a first substrate having a storage electrode and a pixel electrode that receives a data voltage, a second substrate having a common electrode, and a liquid crystal layer interposed between the first and second substrates. The LCD panel has an alignment interval during which liquid crystal molecules transition from a splay state to a bend state and a normal operating interval during the bend state in which an image is displayed. During the alignment interval, the power supply section supplies a first alignment voltage that is higher than the data voltage to the common electrode and supplies a second alignment voltage that is lower than the data voltage to the storage electrode. For example, the voltage difference between the first alignment voltage and the second alignment voltage is at least about 20 V. During the normal operating interval, the power supply section supplies a common voltage that is lower than the first alignment voltage and is higher than the second alignment voltage to the common and storage electrodes. For example, the data voltage swings between the first alignment voltage and the second alignment voltage based on the common voltage.

The power supply section includes a first alignment voltage generating part, a second alignment voltage generating part, a common voltage generating part, a first switching part, and a second switching part. The first alignment voltage generating part generates the first alignment voltage. The second alignment voltage generating part generates the second alignment voltage. The common voltage generating part generates the common voltage. The first switching part is optionally connected to the first alignment voltage generating part and the common voltage generating part. The first switching part is electrically connected to the common electrode. The second switching part is optionally connected to the second alignment voltage generating part and the common voltage generating part. The second switching part is electrically connected to the storage electrode.

The LCD panel further includes a gate line formed on the first substrate, a data line formed on the first substrate and a thin-film transistor electrically connected to the gate line and the data line. The power supply section includes a gate voltage generating part generating a gate-on voltage and a gate-off voltage that controls the operation of the thin-film transistor.

In an exemplary embodiment, the gate-on voltage Von may be used as the first alignment voltage Vb1, and the gate-off voltage Voff may be used as the second alignment voltage Vb2.

In another aspect of the present invention, an LCD device has an LCD panel including a first substrate having a storage electrode and a pixel electrode that receives a data voltage, a second substrate having a common electrode, and a liquid crystal layer interposed between the first and second substrates. The LCD panel has an alignment interval during which liquid crystal molecules are transitioned from a splay state to a bend state and a normal operating interval during which an image is displayed in the bend state. According to the method of driving the LCD device, during the alignment interval, a first alignment voltage that is higher than the data voltage is supplied to the common electrode and a second alignment voltage that is lower than the data voltage is supplied to the storage electrode. Furthermore, a common voltage that is lower than the first alignment voltage and is higher than the second alignment voltage is supplied to the common and storage electrodes, during the normal operating interval.

Accordingly, the speed at which the liquid crystal molecules transition from the transient splay state into the bend state is enhanced, so that the alignment interval may be decreased.

BRIEF DESCRIPTION OF THE DRAWINGS

The above and other advantages of the present invention will become readily apparent by reference to the following detailed description when considered in conjunction with the accompanying drawings, in which.

DESCRIPTION OF THE EMBODIMENTS

Figure 1:
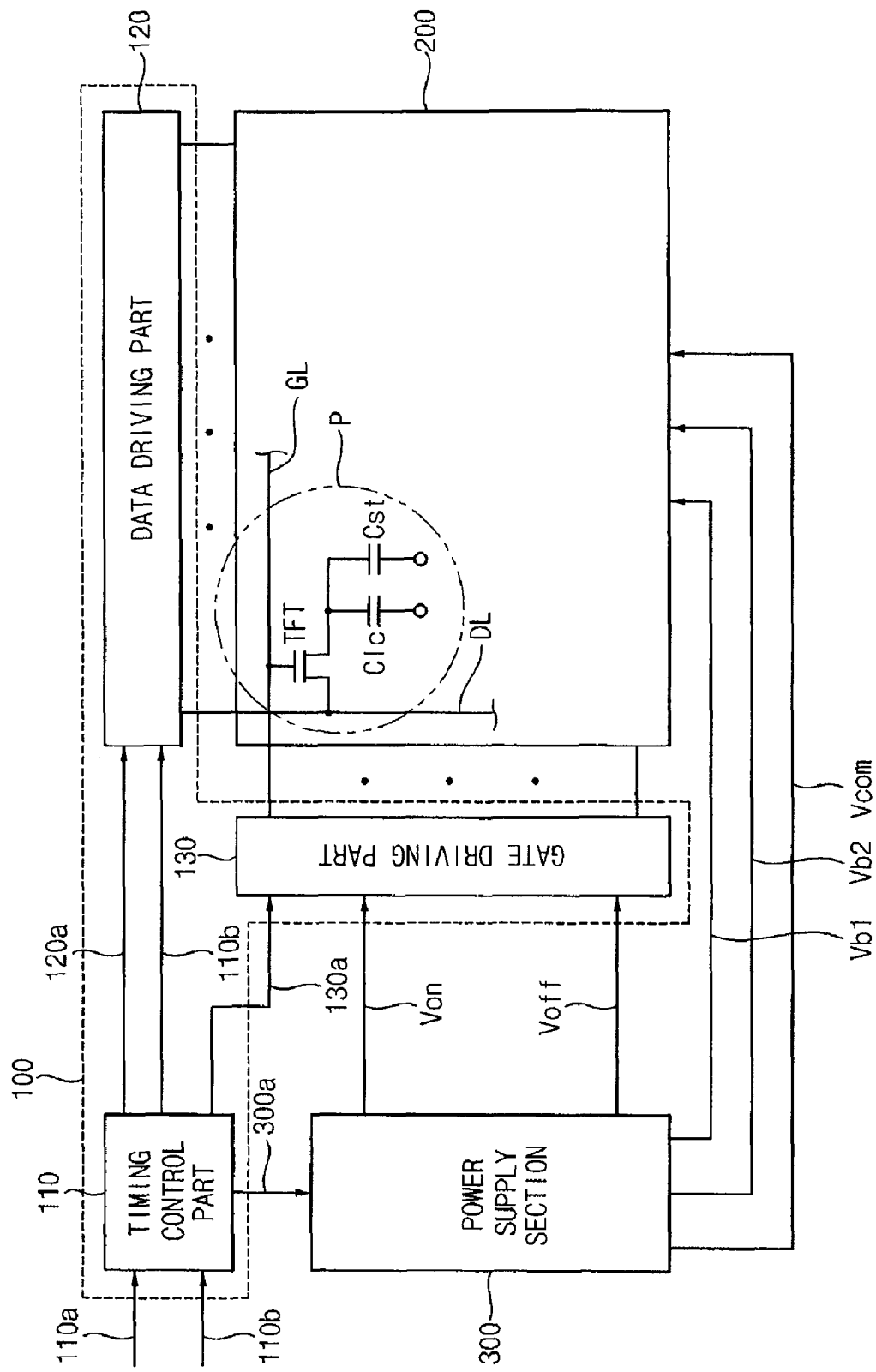
FIG. 1 is a block diagram illustrating a liquid crystal display (LCD) device according to an exemplary embodiment of the present invention.

In the drawings, the size and relative sizes of layers and regions may be exaggerated for clarity. It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Figure 2:
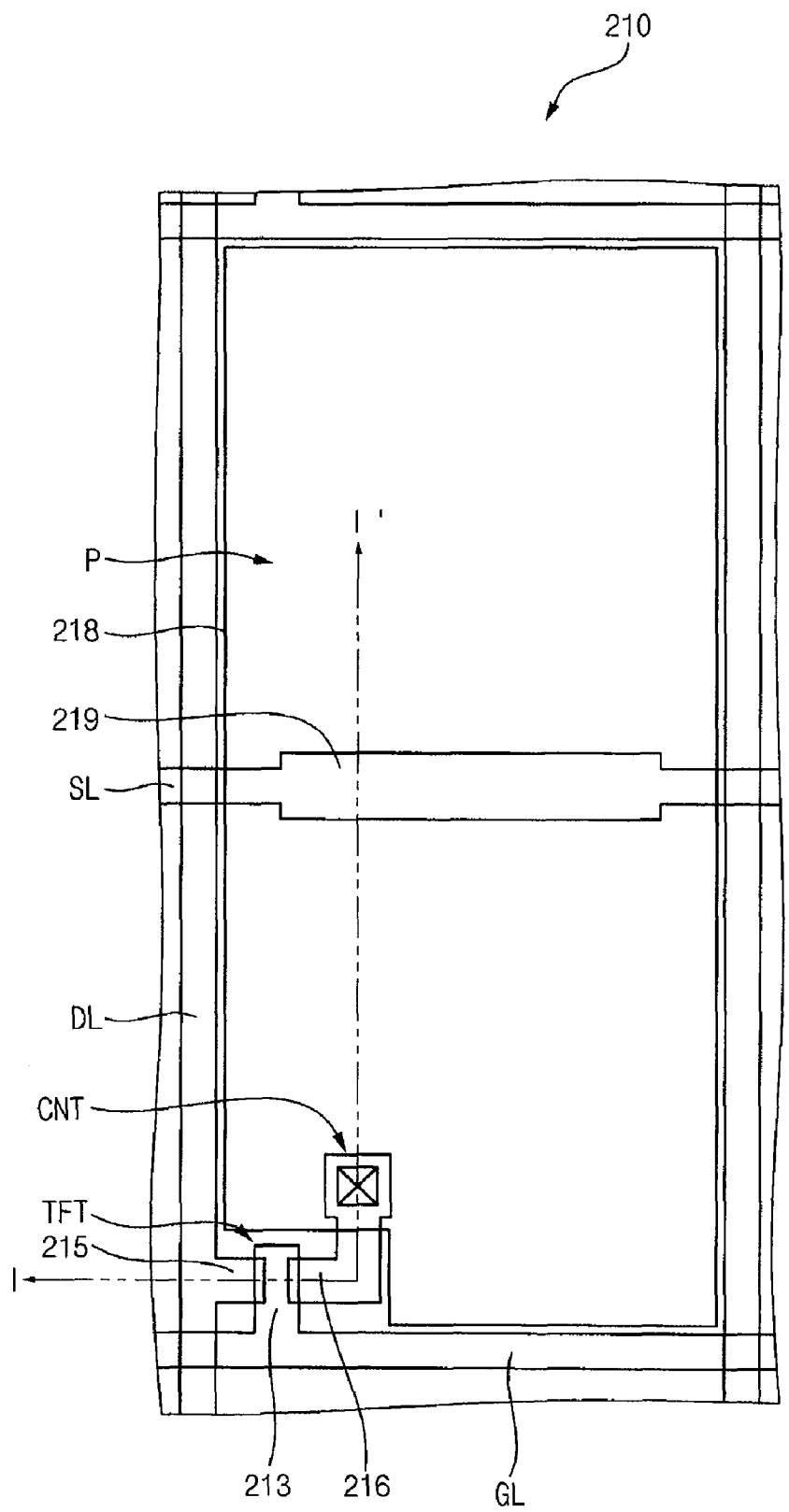
FIG. 2 is a plan view illustrating a first substrate of the LCD panel in FIG. 1.
Figure 3:
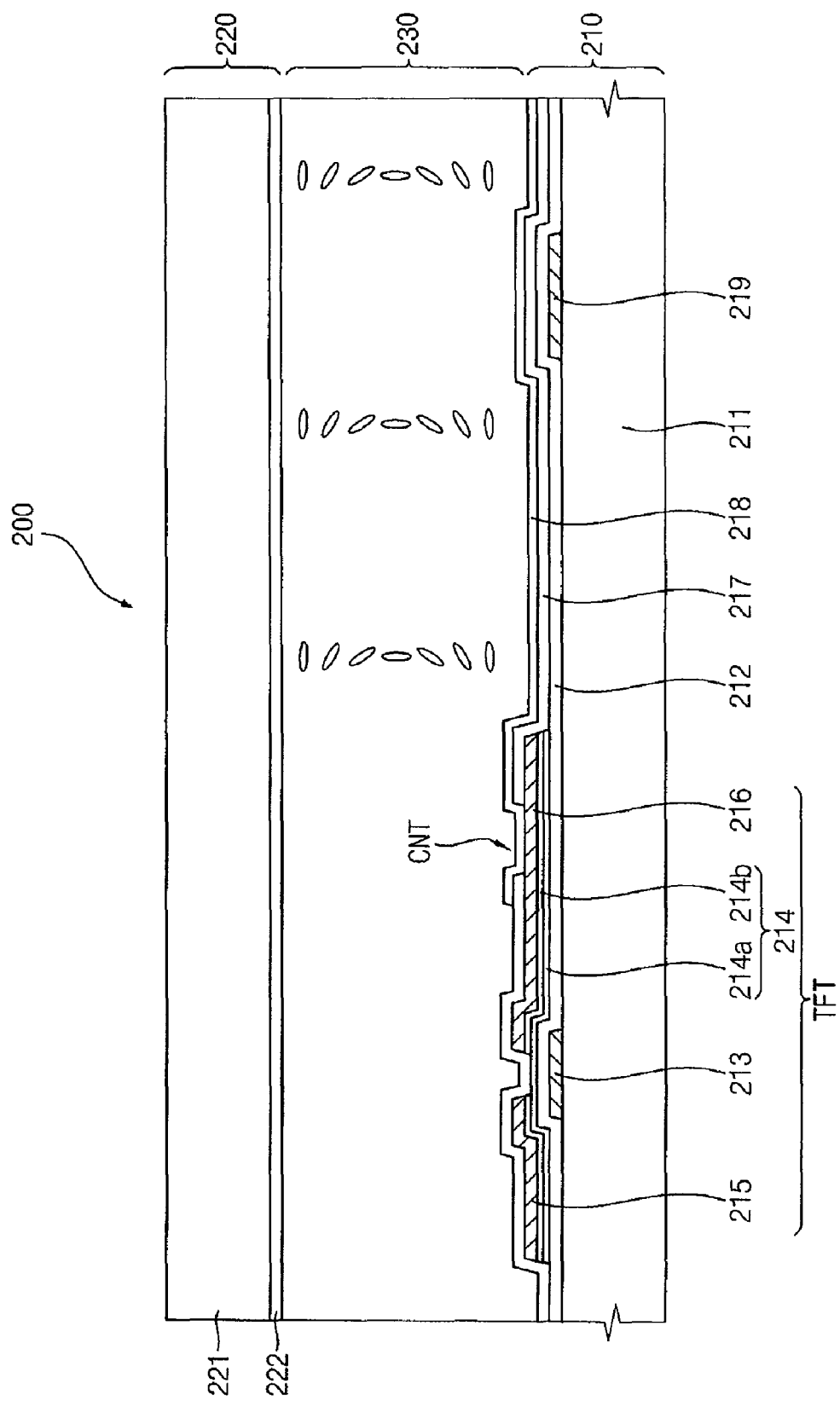
FIG. 3 is a cross-sectional view illustrating the LCD panel taken along the line I-I' of FIG. 2.
Figure 4A:
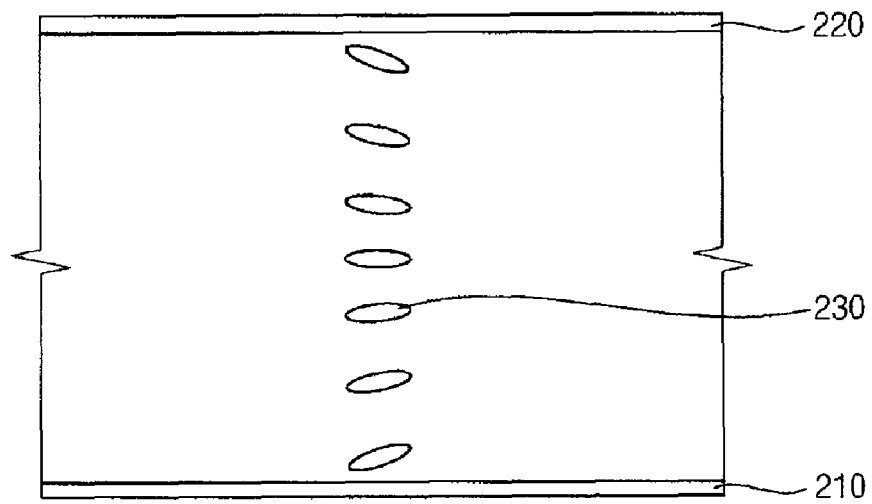
FIG. 4A is a concept diagram illustrating a transient splay state of the LCD panel in FIG. 3.
Figure 4B:
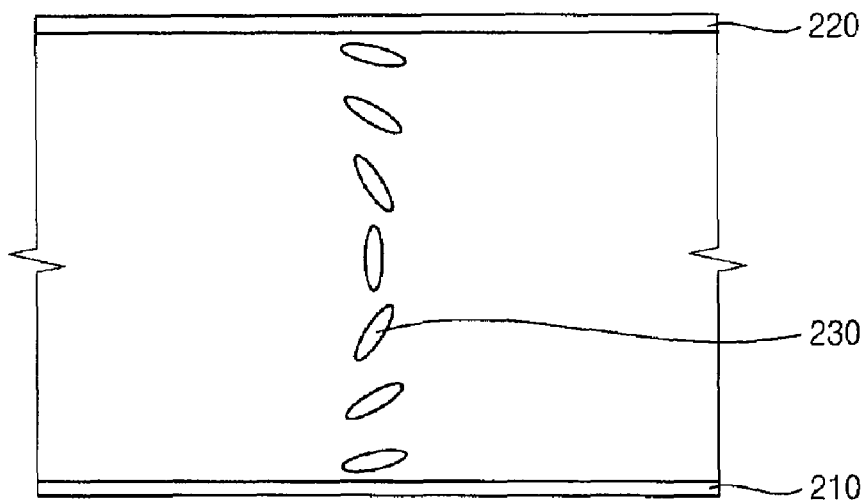
FIG. 4B is a concept diagram illustrating a bend state of the LCD panel in FIG. 3.

FIG. 1 is a block diagram illustrating a liquid crystal display (LCD) device according to an exemplary embodiment of the present invention. FIG. 2 is a plan view illustrating a first substrate of the LCD panel in FIG. 1. FIG. 3 is a cross-sectional view illustrating the LCD panel taken along the line I-I' of FIG. 2. FIG. 4A is a concept diagram illustrating a transient splay state of the LCD panel in FIG. 3. FIG. 4B is a concept diagram illustrating a bend state of the LCD panel in FIG. 3.

Referring to FIG. 1, an LCD device 100 according to an exemplary embodiment of the present invention includes a driving section 100, an LCD panel 200 that displays an image and a power supply section 300 that provides the LCD panel 200 with power for driving the LCD panel 200.

The driving section 100 includes a timing control part 110, a data driving part 120 and a gate driving part 130.

The timing control part 110 receives a timing control signal 110a and a data signal 110b from an external device such as a graph controller, etc. For example, the timing control signal 110a may include a vertical synchronizing signal (Vsync), a horizontal synchronizing signal (Hsync), a main clock signal (MCLK), and a data enable signal (DE). The vertical synchronizing signal (Vsync) represents a time required for displaying one frame. The horizontal synchronizing signal (Hsync) represents the time required for displaying one line of the frame. Thus, the horizontal synchronizing signal (Hsync) includes pulses corresponding to the number of pixels included in one line. The data enable signal (DE) represents the time required for supplying the pixel with data.

The timing control part 110 generates various control signals for driving the data and gate driving parts 120 and 130 in response to the control signal 110a, and outputs the generated control signals to the data and gate driving parts 120 and 130. For example, the timing control part 110 outputs a data control signal 120a to the data driving part 120, and outputs a gate control signal 130a to the gate driving part 130. The data control signal 120a may include a load signal, a horizontal start signal and a polarity control signal for outputting the data signal 110b. The gate control signal 130a may include a gate clock signal (GCLK) and a vertical start signal (STV). Furthermore, the timing control part 110 outputs a power control signal 300a to the power supply section 300.

The data driving part 120 is disposed at a first side of the LCD panel 200. The data driving part 120 converts the data signal 110b into an analog data voltage in response to the data control signal 120a, and outputs the analog data voltage to the LCD panel 200.

The gate driving part 130 is disposed at a second side of the LCD panel 200. The gate driving part 130 provides the LCD panel 200 with a gate-on voltage Von or a gate-off voltage Voff provided from the power supply section 300 in response to the gate control signal 130a.

The LCD panel 200 displays an image using power provided from the power supply section 300 in response to control of a timing control section 110.

Referring to FIGS. 3, 4A and 4B, the LCD panel 200 includes a first substrate 210, a second substrate 220 that faces the first substrate 210 and an optical compensated bend (OCB) mode liquid crystal layer 230 interposed between the first and second substrates 210 and 220.

The OCB mode liquid crystal layer 230 maintains a transient splay state that is an initial alignment state at no more than a critical voltage along the alignment direction of an alignment layer (not shown) formed between the first substrate 210 and the second substrate 220, as shown in FIG. 4A. In the liquid crystal layer 230 of the transient splay state, the liquid crystal molecules are arranged on each alignment layers formed on the first and second substrate 210 and 220, respectively. The liquid crystal molecules adjacent to the alignment layers have a pre-tilt angle of about 2° to about 5°. The liquid crystal molecules are arranged left-and-right symmetrically to a central portion of the liquid crystal layer 230, and thus a pre-tilt angle is about 0° in the central portion of the liquid crystal layer 230.

The liquid crystal layer 230 of the transient splay state is transitioned into a bend state at a more than the critical voltage, as shown in FIG. 4B. In the liquid crystal layer 230 of the bend state, liquid crystal molecules are arranged on each alignment layers formed on the first and second substrate 210 and 220. The liquid crystal molecules adjacent to the alignment layers have a pre-tilt angle of about 2° to about 5°. The liquid crystal molecules are arranged left-and-right symmetrically to a central portion of the liquid crystal layer 230, and thus the pre-tilt angle is about 90° in the central portion of the liquid crystal layer 230. The liquid crystal layer 230 of the bend state has the characteristic that the light transmittance ratio linearly decreases with increasing voltage.

Therefore, the LCD device having an OCB mode liquid crystal layer 230 is operated with an alignment interval and a normal operating interval. The liquid crystal layer 230 is transitioned from a transient splay state into a bend state, during the alignment interval and an image is displayed using the liquid crystal layer 230 of the bend state during the normal operating interval.

When an electric field applied to the OCB mode liquid crystal layer 230 is increased, the conversion from the transient splay state to the bend state is relatively fast. Therefore, there is a voltage difference between the first substrate 210 and the second substrate 220, so that the transition speed of the liquid crystal layer 230 may be decreased.

Referring to FIGS. 2 and 3, the first substrate 210 includes a plurality of gate lines GLs, a plurality of data lines DLs and a plurality of pixel sections Ps. The data lines DLs cross the gate lines GLs such that the data lines DLs are insulated from the gate lines GLs. Adjacent two gate lines and adjacent two data lines define pixel section P. Each of the pixel section Ps includes a thin-film transistor (TFT) electrically connected to the gate line GL and the data line DL, a liquid crystal capacitor Clc electrically connected to the TFT, and a storage capacitor Cst electrically connected to the TFT.

The gate line GL is formed on an insulation layer 211 to define an upper portion and a lower portion of pixel section P. A gate insulation layer 212 is formed on the insulation substrate 211 having the gate line formed thereon to cover the gate line GL. In one embodiment, the gate insulation layer 212 includes a silicon nitride layer (SiNx) or a silicon oxide layer (SiOx), although other suitable insulating layers would also be within the scope of these embodiments.

The data line DL is formed on the gate insulation layer 212 to define an upper and a lower portion of pixel section P.

The TFT is formed within the pixel section P and electrically connected to the gate line GL and the data line DL. The TFT applies a data voltage provided through the data line DL to a pixel electrode 218 of the pixel section P in response to a gate signal provided through the gate line GL.

The TFT includes a gate electrode 213, an activation layer 214, a source electrode 215 and a drain electrode 216.

The gate electrode 213 is electrically connected to the gate line GL to define a gate terminal of the TFT.

The activation layer 214 is formed on the gate insulation layer 212 to cover the gate electrode 213. The activation layer 214 may include a semiconductor layer 214a and an ohmic contact layer 214b. For example, the semiconductor layer 214b may include amorphous silicon (a-Si), and the ohmic contact layer 214b may include n+ amorphous silicon (n+a-Si). In an exemplary embodiment, n+ impurities are implanted into the amorphous silicon layer (a-Si) at a high concentration to form the ohmic contact 214b.

The source electrode 215 is formed on the activation layer 214 to be electrically connected to the data line DL, thereby forming a source terminal of the TFT. The drain electrode 216 is formed on the activation layer 214 to be electrically isolated from the source electrode 215, thereby forming a drain terminal of the TFT. The drain electrode 216 is electrically connected to the pixel electrode 218 through a contact hole CNT formed on the protection layer 217. The source and drain electrodes 215 and 216 are spaced apart from each other on the activation layer 214, thereby forming a channel of the TFT.

The protection layer 217 is formed on an insulation substrate 221 having the data line DL formed thereon. The protection layer 217 includes, for example, a silicon nitride layer (SiNx) or a silicon oxide layer (SiOx).

The pixel electrode 218 is formed on the protection layer 217 corresponding to each of the pixel sections P. The pixel electrode 218 includes an optically transparent and electrically conductive material in order to transmit light. For example, the pixel electrode 218 includes indium zinc oxide (IZO), indium tin oxide (ITO), etc. The pixel electrode 218 is electrically connected to the drain electrode 216 through a contact hole CNT formed on the protection layer 217.

The first substrate 210 further includes a storage electrode 219 to form the storage capacitor Cst. The storage electrode 219 is electrically connected to a storage line SL, and is formed within the pixel section P. The storage electrode 219 and the storage line SL are simultaneously formed from the same layer and material as the gate line GL and the gate electrode 213. Alternatively, the storage electrode 219 and the storage line SL may be simultaneously formed from the same layer and material as the data line DL.

The storage electrode 219 is opposite to the pixel electrode 218 via the gate insulation layer 212 and the protection layer 217, thereby forming the storage capacitor Cst. A data voltage applied to the pixel electrode 218 through the TFT is maintained by the storage capacitor Cst during one frame interval.

The second substrate 220 is opposite to the first substrate 210 via the liquid crystal layer 230. The second substrate 220 includes an insulation substrate 221 and a common electrode 222 formed on the insulation substrate 221. Alternatively, the second substrate 220 may further include a color filter layer to realize a color.

The common electrode 222 includes an optically transparent and electrically conductive material in order to transmit light. For example, the common electrode 222 may include indium zinc oxide (IZO), indium tin oxide (ITO), etc. The common electrode 222, the pixel electrode 218 and the liquid crystal layer 230 define the liquid crystal capacitor Clc.

In the LCD panel 200 having the above structure, the alignment state of the liquid crystal layer 230 is transitioned in accordance with a voltage applied to the common electrode 222, the pixel electrode 218, and the storage electrode 219.

Referring to FIGS. 1 and 3, the power supply section 300 outputs a power source voltage for activating the LCD panel 200 in response to the timing control part 110.

The power supply section 300 provides the common electrode 222 and the storage electrode 219 with a common voltage Vcom to form the liquid crystal capacitor Clc and the storage capacitor Cst in a normal operating state in which the LCD panel 200 displays an image.

The power supply section 300 provides the common electrode 222 with a first alignment voltage Vb1 that is higher than the data voltage applied to the pixel electrode 218, and provides the storage electrode 219 with a second alignment voltage Vb2 that is lower than the data voltage Vp in the alignment interval during which the liquid crystal layer 230 is transitioned from a transient splay state into a bend state. For example, the voltage difference between the first alignment voltage Vb1 and the second alignment voltage Vb2 may be at least about 20 V for a transition of the liquid crystal layer 230.

As described above, when a relatively higher voltage than the pixel voltage Vp is applied to the common electrode 222 positioned in an upper portion of the liquid crystal layer 230 and a relatively lower voltage than the pixel voltage Vp is applied to the storage electrode 219 positioned in a lower portion of the liquid crystal layer 230, the voltage difference between two end portions of the liquid crystal layer 230 is decreased so that the transition speed of the liquid crystal layer 230 may be decreased.

Figure 5:
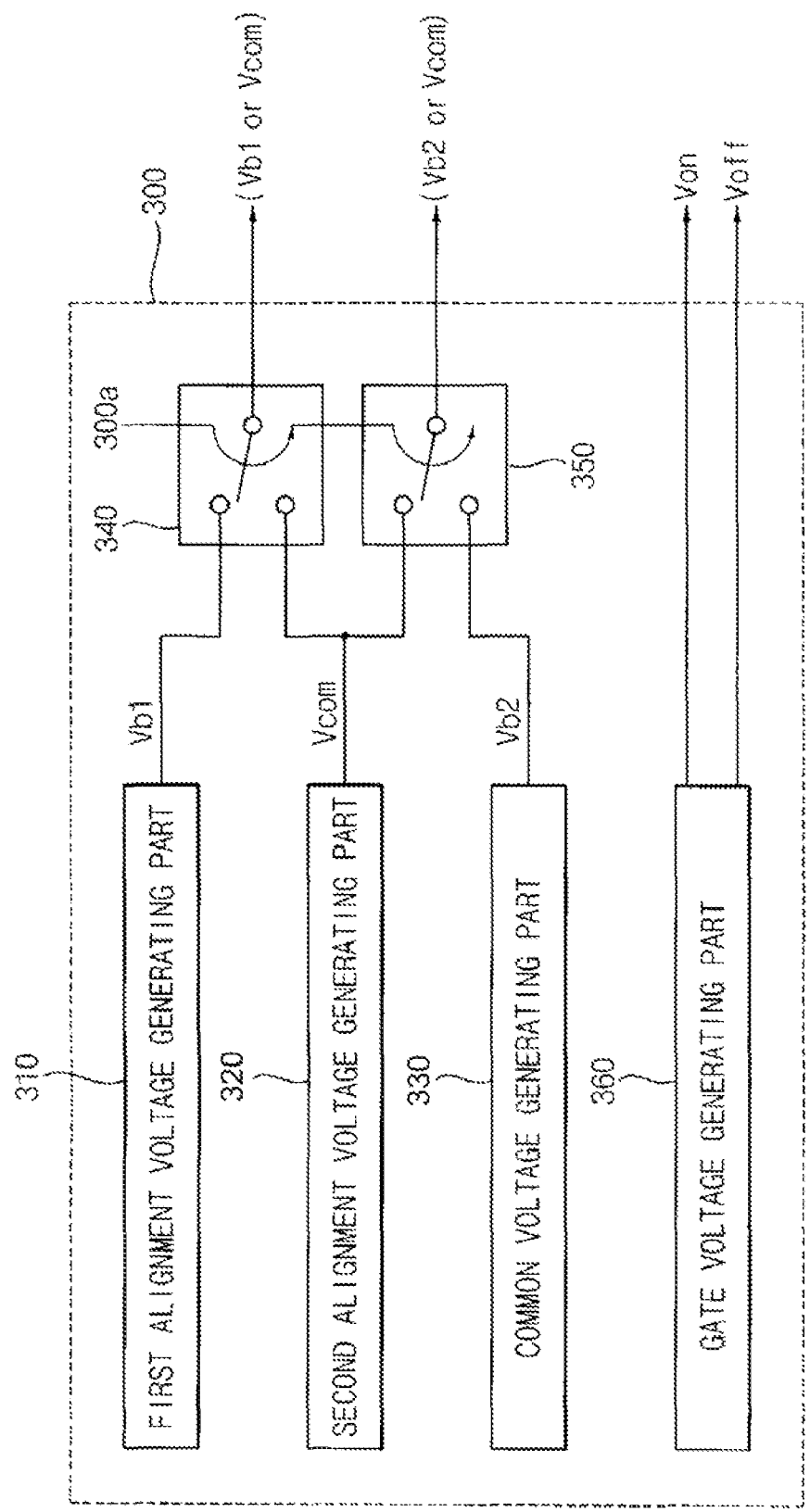
FIG. 5 is a schematic block diagram showing a power supply section in FIG. 1.
Figure 6:
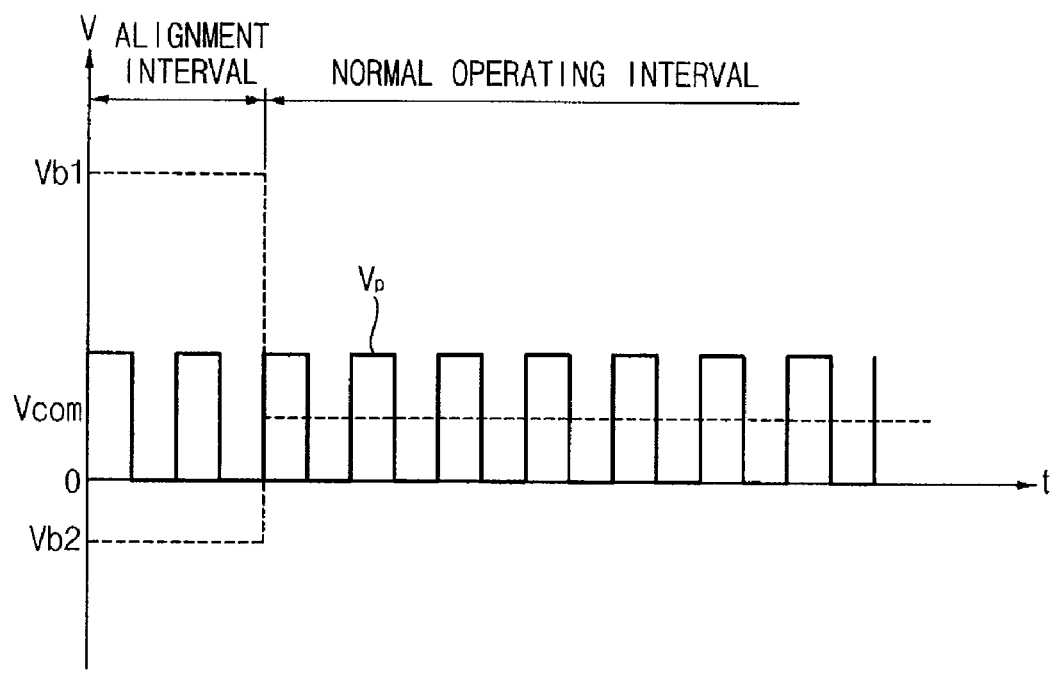
FIG. 6 is a timing diagram illustrating a driving state of an LCD device in FIG. 1.
Figure 7:
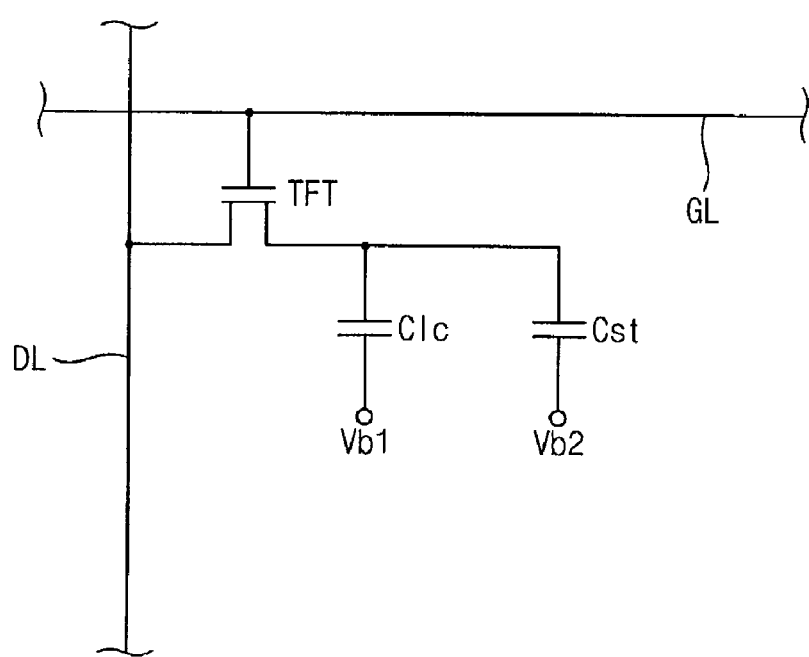
FIG. 7 is an equivalent circuit diagram illustrating an LCD panel in an alignment interval.
Figure 8:
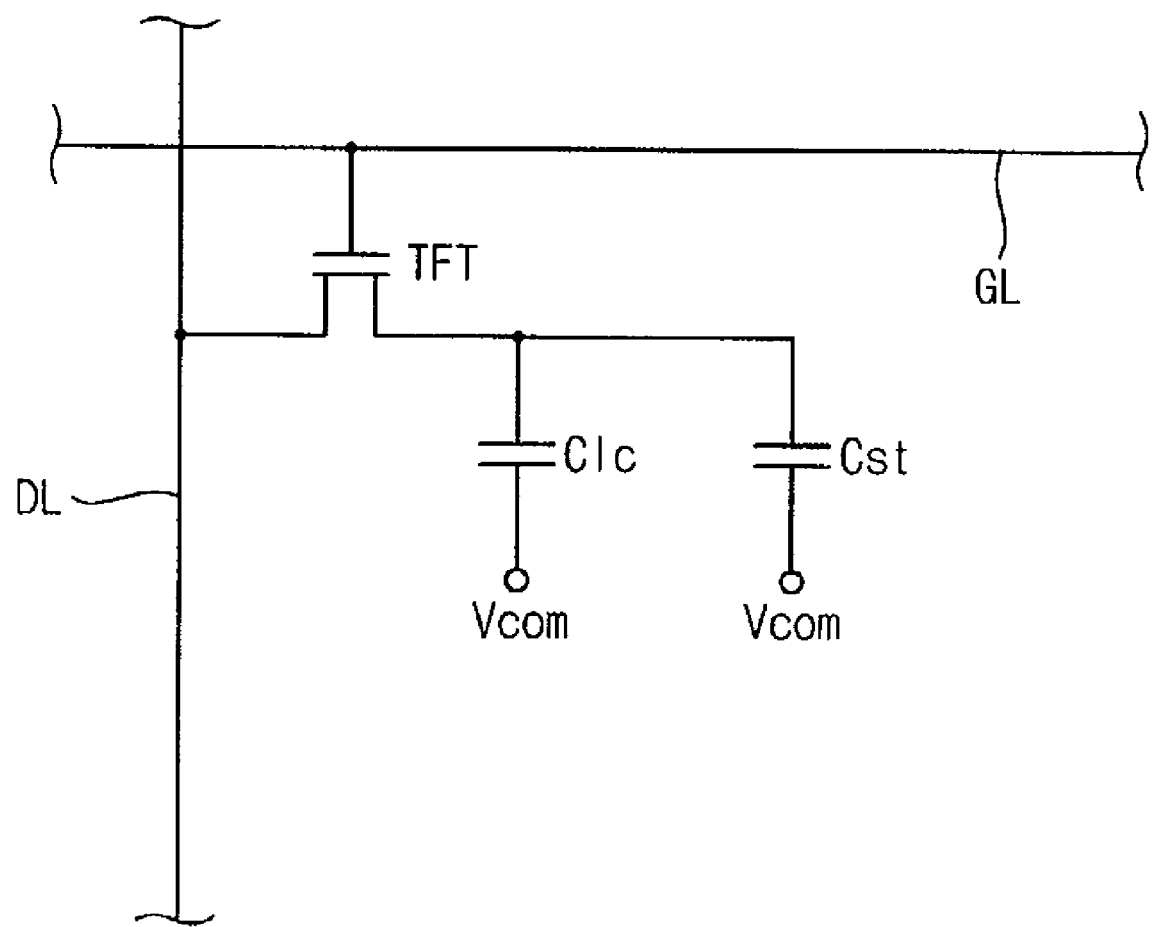
FIG. 8 is an equivalent circuit diagram illustrating an LCD panel in a normal operating interval.

FIG. 5 is a schematic block diagram showing a power supply section in FIG. 1. FIG. 6 is a timing diagram illustrating a driving state of an LCD device in FIG. 1. FIG. 7 is an equivalent circuit diagram illustrating an LCD panel in an alignment interval. FIG. 8 is an equivalent circuit diagram illustrating an LCD panel in a normal operating interval.

Referring to FIGS. 3, 5 and 6, a power supply section 300 may include a first alignment voltage generating part 310, a second alignment voltage generating part 320, a common voltage generating part 330, a first switching part 340 and a second switching part 350.

The first alignment voltage generating part 310 generates a first alignment voltage Vb1 that is higher than the data voltage Vp, and then provides the LCD panel 200 with the first alignment voltage Vb1. For example, the first alignment voltage Vb1 may be about 18 V to about 22 V. Especially, the first alignment voltage Vb1 may be about 20 V.

The second alignment voltage generating part 320 generates a second alignment voltage Vb2 that is lower than the first alignment and data voltages Vb1 and Vp, and then provides the LCD panel 200 with the second alignment voltage Vb2. For example, the second alignment voltage Vb2 may be about −3 V to about −7 V. Especially, the second alignment voltage Vb2 may be about −5 V.

The common voltage generating part 330 generates a common voltage Vcom that corresponds to the average of the data voltage Vp swings, and then provides the LCD panel 200 with the common voltage Vcom. For example, the data voltage Vp swings between the first alignment voltage Vb1 and the second alignment voltage Vb2. Here, the common voltage Vcom may be about 5 V to about 9 V. Especially, the common voltage Vcom may be about 7 V.

The first switching part 340 optionally selects one of the first alignment voltage Vb1 and the common voltage Vcom in response to a power control signal 300a provided from the timing control part 110, and then provides the common electrode 222 with the selected signal. In order to perform as mentioned above, a first portion of the first switching part 340 is optionally connected to the first alignment voltage generating part 310 and the common voltage generating part 330, and a second portion of the first switching part 340 is electrically connected to the common electrode 222.

The second switching part 350 optionally selects one of the second alignment voltage Vb2 and the common voltage Vcom in response to a power control signal 300a provided from the timing control part 110, and then provides the storage electrode 219 with the selected signal. In order to perform as mentioned above, a first portion of the second switching part 350 is optionally connected to the second alignment voltage generating part 320 and the common voltage generating part 330, and a second portion of the second switching part 350 is electrically connected to the storage electrode 219.

As shown in FIG. 7, during the alignment interval in which liquid crystal molecules are transitioned from a splay state to a bend state, the first and second switching parts 340 and 350 are electrically connected to the first and second alignment voltage generating parts 310 and 320, respectively.

Therefore, during the alignment interval, the first alignment voltage Vb1 provided from the first alignment voltage generating part 310 is applied to the common electrode 222, and the second alignment voltage Vb2 provided from the second alignment voltage generating part 320 is applied to the storage electrode 219, as shown in FIG. 6. The data voltage Vp applied to the pixel electrode 218 swings between the first alignment voltage Vb1 and the second alignment voltage Vb2 based on the common voltage Vcom. Alternatively, the data voltage Vp applied to the pixel electrode 218 may be relatively lower than the common voltage Vcom (i.e., about 0 V) during the alignment interval.

For example, when the first alignment voltage Vb1 applied to the common electrode 222 is about 20 V and the data voltage Vp applied to the pixel electrode 218 swings between about 0 V to about 14 V, the voltage difference of about 6 V to about 20 V is generated at two end portions of the liquid crystal layer 230. However, when the second alignment voltage Vb1 of about −5 V is applied to the storage electrode 219, the voltage difference of maximum about 25 V may be generated at two end portions of the liquid crystal layer 230. Accordingly, the voltage difference between two end portions of the liquid crystal layer 230 is increased through applying the second alignment voltage Vb2 to the storage electrode 219, so that the transition speed of the liquid crystal layer 230 may be enhanced.

As shown in FIG. 8, during the normal operating interval in which liquid crystal molecules maintain a bend state, the first and second switching parts 340 and 350 are electrically connected to the common voltage generating parts 330.

Therefore, during the normal operating interval, the common voltage Vcom provided from the common voltage generating part 330 is applied to the common electrode 222 and the storage electrode 219, as shown in FIG. 6. The data voltage Vp applied to the pixel electrode 218 swings based on the common voltage Vcom.

For example, when the common voltage Vcom applied to the common electrode 222 and the storage electrode 219 is about 7 V, the data voltage Vp applied to the pixel electrode 218 swings between about 0 V to about 14 V based on the common voltage Vcom.

The pixel electrode 218, the common electrode 222 and the liquid crystal layer 230 interposed between the pixel and common electrodes 218 and 222 define the liquid crystal capacitor Clc. The pixel electrode 218, the storage electrode 219 and the gate insulation layer and protection layer 212 and 217 interposed between the pixel and storage electrodes 218 and 219 define the storage capacitor Cst. The alignment state of the liquid crystal layer 230 is transitioned by the data voltage Vp of the pixel electrode 218 and the common voltage Vcom of the common electrode 222, so that an image is normally displayed using a method that maintains the alignment state during one frame interval.

Referring to FIGS. 1 and 5, the power supply section 300 may further include a gate voltage generating part 360. The gate voltage generating part 360 generates a gate-on voltage Von and a gate-off voltage Voff which controls the TFT, and then provides the gate line GL of the LCD panel 200 with the gate-on voltage Von and the gate-off voltage Voff.

The gate-on voltage Von is a voltage for turning-on the TFT, and the gate-off voltage Voff is a voltage for turning-off the TFT. The gate-on and gate-off voltages Von and Voff are applied to the gate line GL of the LCD panel 200 through the gate driving part 130 in response to the timing control part 110. For example, the gate-on voltage Von may be about 18 V to about 22 V, and the gate-off voltage Voff may be about −3 V to about −7 V.

The gate-on voltage Von generated from the gate voltage generating part 360 is substantially equal to the first alignment voltage Vb1 generated from the first alignment voltage generating part 310, and the gate-off voltage Voff generated from the gate voltage generating part 360 is substantially equal to the second alignment voltage Vb2 generated from the second alignment voltage generating part 320.

Therefore, when the gate-on and gate-off voltages Von and Voff are used as the first and second alignment voltages Vb1 and Vb2, respectively, the first and second alignment voltage generating parts 310 and 320 may be omitted such that the power supply section 300 may be simple.

According to the LCD device and a method of driving the LCD device, an alignment voltage that is lower than the common voltage is applied to the storage electrode, so that a transition speed at which the OCB mode liquid crystal molecules are transitioned from a transient splay state into a bend state may be enhanced. Therefore, the alignment interval may be decreased such that a display quality may be enhanced.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A liquid crystal display (LCD) device comprising:
an LCD panel including a first substrate having a storage electrode and a pixel electrode that receives a data voltage in response to operation of a thin-film transistor, a second substrate having a common electrode, and a liquid crystal layer interposed between the first and second substrates, the LCD panel having an alignment interval during which liquid crystal molecules are transitioned from a splay state to a bend state, and a normal operating interval during which an image is displayed during the bend state; and
a power supply section comprising a first alignment voltage generating part configured to generate a first alignment voltage, a second alignment voltage generating part configured to generate a second alignment voltage, and a gate voltage generating part configured to generate a gate-on voltage and a gate-off voltage, a common voltage generating part generating the common voltage, a first switching part being optionally connected to the first alignment voltage generating part and the common voltage generating part, the first switching part being electrically connected to the common electrode and a second switching part being optionally connected to the second alignment voltage generating part and the common voltage generating part, the second switching part being electrically connected to the storage electrode,
wherein the first alignment voltage is higher than the data voltage and is applied to the common electrode during the alignment interval, and the second alignment voltage is lower than the data voltage and is applied to the storage electrode during the alignment interval,
wherein the gate-on and gate-off voltages control operation of the thin-film transistor, and
wherein the power supply section supplies a common voltage that is lower than the first alignment voltage and is higher than the second alignment voltage to the common and storage electrodes during the normal operating interval.

2. The LCD device of claim 1, wherein the data voltage swings between the first alignment voltage and the second alignment voltage based on the common voltage.

3. The LCD device of claim 2, wherein the voltage difference between the first alignment voltage and the second alignment voltage is at least about 20 V.

4. The LCD device of claim 3, wherein the data voltage swings between about 0 V to about 16 V when the first alignment voltage is about 18 V to about 22 V, the second alignment voltage is about −3 V to about −7 V, and the common voltage is about 5 V to about 9 V.

5. The LCD device of claim 1, wherein the first switching part is electrically connected to the first alignment voltage generating part during the alignment interval and the second switching part is electrically connected to the second alignment voltage generating part during the alignment interval.

6. The LCD device of claim 1, wherein the first and second switching parts are electrically connected to the common voltage generating part during the normal operating interval.

7. The LCD device of claim 6, wherein the first substrate of the LCD panel further comprises a gate line, a data line and a thin-film transistor eclectically connected to the gate line and the data line.

8. The LCD device of claim 7, wherein the first substrate further comprises:
an insulation substrate having the gate line and the storage electrode formed thereon;
a gate insulation layer being formed on the gate line and the storage electrode, the gate insulation layer being formed below the data line; and
a protection layer being formed between the data line and the pixel electrode.

9. A method for driving a liquid crystal display (LCD) device having an LCD panel including a first substrate having a storage electrode and a pixel electrode that receives a data voltage, a second substrate having a common electrode, and a liquid crystal layer interposed between the first and second substrates, the LCD panel having an alignment interval during which liquid crystal molecules are transitioned from a splay state to a bend state and a normal operating interval during which an image is displayed during the bend state, the method comprising:
supplying a first alignment voltage, a second alignment voltage, a gate-on voltage, and a gate-off voltage from a power supply section and
supplying a common voltage that is lower than the first alignment voltage and is higher than the second alignment voltage to the common and storage electrodes during the normal operating interval,
wherein the power supply section comprises a first alignment voltage generating part generating the first alignment voltage, a second alignment voltage generating part generating the second alignment voltage, and a gate voltage generating part generating the gate-on voltage and the gate-off voltage, a common voltage generating part generating the common voltage, a first switching part being optionally connected to the first alignment voltage generating part and the common voltage generating part, the first switching part being electrically connected to the common electrode and a second switching part being optionally connected to the second alignment voltage generating part and the common voltage generating part, the second switching part being electrically connected to the storage electrode
wherein the first alignment voltage is higher than the data voltage to the common electrode and supplying the second alignment voltage that is lower than the data voltage to the storage electrode during the alignment interval,
wherein the gate-on and gate-off voltages control operation of the thin-film transistor.

10. The method of claim 9, wherein the data voltage swings between the first alignment voltage and the second alignment voltage based on the common voltage.

11. The method of claim 10, wherein a voltage difference between the first alignment voltage and the second alignment voltage is at least about 20 V.

12. The method of claim 11, wherein the data voltage swings between about 0 V to about 16 V, when the first alignment voltage is about 18 V to about 22 V, the second alignment voltage is about −3 V to about −7 V, and the common voltage is about 5 V to about 9 V.

* * * * *